(12) United States Patent
Treacy (10) Patent No.: US 7,757,339 B2
(45) Date of Patent: Jul. 20, 2010

(54) APPARATUS AND METHODS FOR SURFACE TREATMENT WITH USER-SELECTABLE LIQUID DISPENSING

(75) Inventor: Terrence Treacy, Mansfield, TX (US)

(73) Assignee: TXF Products, Inc., Arlington, TX (US)

( * ) Notice: Subject to any disclaimer, the term of this patent is extended or adjusted under 35 U.S.C. 154(b) by 910 days.

(21) Appl. No.: 11/548,144

(22) Filed: Oct. 10, 2006

(65) Prior Publication Data

US 2009/0052974 A1    Feb. 26, 2009

Related U.S. Application Data

(60) Provisional application No. 60/727,611, filed on Oct. 18, 2005.

(51) Int. Cl.
*A47L 13/50*    (2006.01)
(52) U.S. Cl. .................................. 15/264; 15/257.01
(58) Field of Classification Search ............... 15/264, 15/257.01, 260, 261; 141/363, 364, 375; 280/47.34, 47.35, 79.11, 79.2, 79.3, 79.5, 280/30, 32.5
See application file for complete search history.

(56) References Cited

U.S. PATENT DOCUMENTS

| 2,129,113 | A |   | 9/1938 | Bancons |         |
|-----------|---|---|--------|---------|---------|
| 3,045,252 | A | * | 7/1962 | Sorrells | ......... 4/626 |
| 4,174,977 | A |   | 11/1979 | Shallenberg et al. | |
| 5,058,738 | A |   | 10/1991 | Svensson | |
| 6,017,163 | A |   | 1/2000 | Keppers et al. | |
| 6,802,908 | B2 |  | 10/2004 | Zachhuber | |
| 7,597,125 | B2 | * | 10/2009 | Deaton | ......... 141/364 |
| 2002/0175092 | A1 |  | 11/2002 | Stulens et al. | |
| 2003/0216272 | A1 |  | 11/2003 | Sherry et al. | |
| 2004/0019998 | A1 |  | 2/2004 | Sander | |
| 2004/0217238 | A1 |  | 11/2004 | Chochinov et al. | |
| 2004/0231700 | A1 |  | 11/2004 | Bell et al. | |
| 2005/0252921 | A1 | * | 11/2005 | Van Landingham | ......... 220/608 |

FOREIGN PATENT DOCUMENTS

| EP | 0382691 B1 | 8/1990 |
|----|------------|--------|
| EP | 0781524 A2 | 7/1997 |
| EP | 1358832 A1 | 5/2003 |

(Continued)

OTHER PUBLICATIONS

PCT International Search Report dated Apr. 26, 2007.

*Primary Examiner*—Dung Van Nguyen
(74) *Attorney, Agent, or Firm*—Haynes and Boone, LLP (57) ABSTRACT

An apparatus including a first reservoir containing a liquid, a second reservoir configured to receive an element, and user-operable dispensing means configured to dispense a user-selected amount of the liquid from the first reservoir to the second reservoir. The element is configured to absorb the user-selected amount of dispensed liquid and transfer it out of the second reservoir for surface treatment. In operation, a user-selected amount of liquid is dispensed from the first reservoir into the second reservoir, and substantially all of the dispensed liquid is absorbed by placing a mop pad or other liquid transferring element in the second reservoir. Substantially all of the dispensed liquid is then transferred to the surface to be treated by removing the liquid transferring element from the second reservoir and placing the liquid transferring element against the surface.

9 Claims, 8 Drawing Sheets

FOREIGN PATENT DOCUMENTS

| | | | |
|---|---|---|---|
| FR | 2565812 A | 12/1985 |
| GB | 2388577 A | 11/2003 |
| LU | 40154 A1 | 7/1961 |
| WO | 0000077 | 1/2000 |
| WO | 0054646 | 9/2000 |
| WO | 0200089 A1 | 1/2002 |

* cited by examiner

APPARATUS AND METHODS FOR SURFACE TREATMENT WITH USER-SELECTABLE LIQUID DISPENSING

This application claims the benefit of the earlier filing date of commonly-assigned U.S. Provisional Patent Application No. 60/727,611, entitled "APPARATUS AND METHODS FOR SURFACE TREATMENT WITH USER-SELECTABLE LIQUID DISPENSING," filed Oct. 18, 2005.

BACKGROUND

There are many previously known floor mopping apparatus. Typically, a floor mop includes a mop head and a handle. The mop head is often a bundle of absorptive strands banded at one end and coupled to the handle, or a micro-fiber pad attached to rectangular plate by hook-and-loop strips, straps, elastic or other materials. During use, the mop head is submersed in a mop bucket containing a cleaning solution, often a detergent or other cleaning agent diluted in water. After thoroughly soaking the mop head in the cleaning solution, the mop head must be wrung out or otherwise manipulated to remove excess liquid. Thereafter, the mop head is pushed across the floor being cleaned by a user gripping the opposing end of the handle. Once a portion of the floor has been cleaned in this manner, the user re-submerses the mop head in the cleaning solution to remove any particulate removed from the floor, and to re-wet the mop head. The user repeats this process until the entire floor has been cleaned.

However, by re-submersing the mop head in the cleaning solution between each iteration of the above-described process, any particulate removed from the floor may inadvertently be returned to the floor during subsequent iterations. Moreover, the process of wringing out the mop head after each submersion in the cleaning solution can be difficult and time-consuming, and can also expose the user to infectious, toxic, contaminated and otherwise harmful materials previously removed from the floor, particularly in medical and scientific facilities.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Figure 1:
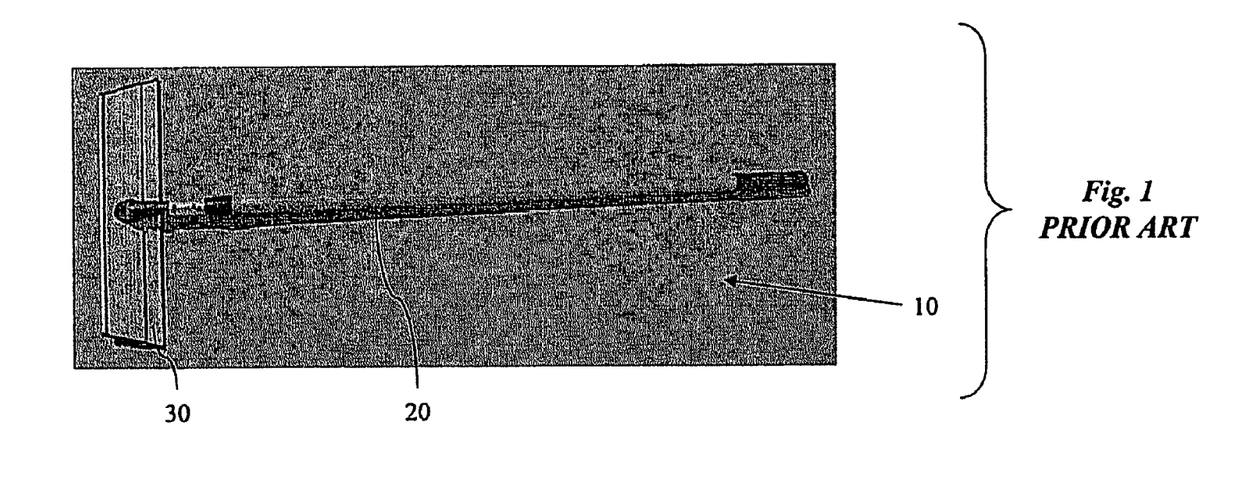
FIG. 1 is a perspective view of a conventional floor mop.
Figure 2:
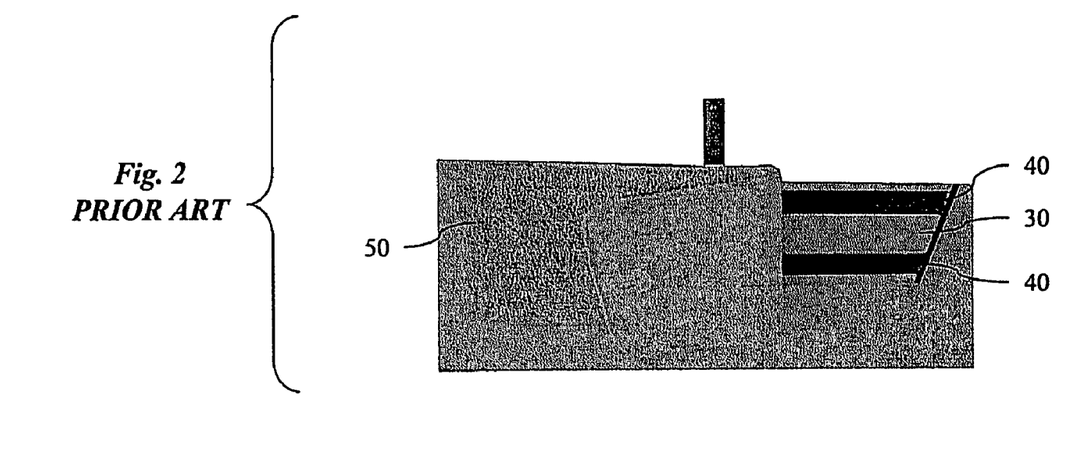
FIG. 2 is a perspective view of a head portion of the mop shown in FIG. 1.

Referring to FIGS. 1 and 2, collectively, illustrated are various views of a conventional mop device 10. One or more components of the device 10 may be used in conjunction with apparatus according to one or more aspects of the present disclosure. The mop device 10 includes a telescoping handle portion 20 and a mop head portion 30. The mop head portion 30 includes hook-and-loop strips 40 (e.g., VELCRO) for securing a detachable micro-fiber mop pad 50, as shown in FIG. 2. The mop device 10 may also or alternatively be used in conjunction with other types of detachable pads, such as those comprising a sponge, a coarse-fiber mop pad, a squeegee, and/or other synthetic absorbing-type materials.

Figure 3:
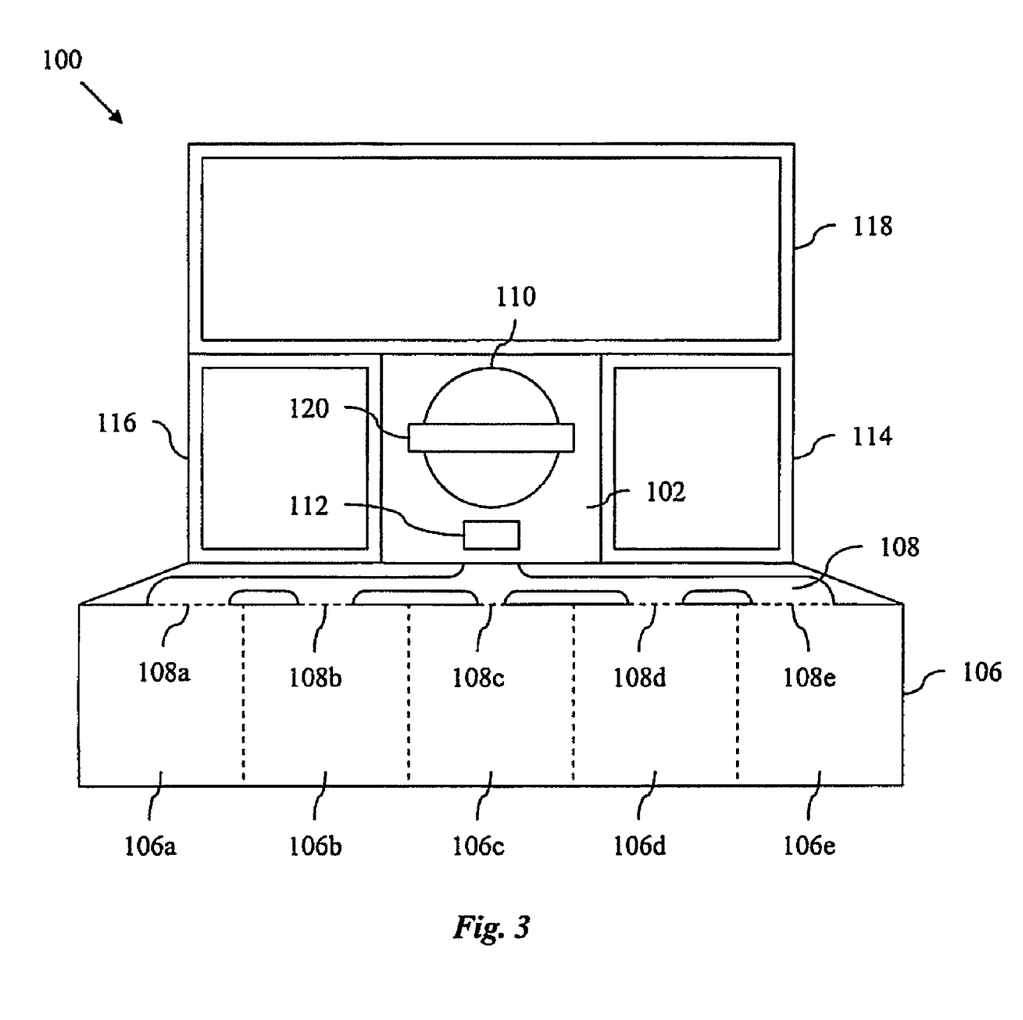
FIG. 3 is a top view of at least a portion of apparatus according to aspects of the present disclosure.
Figure 4:
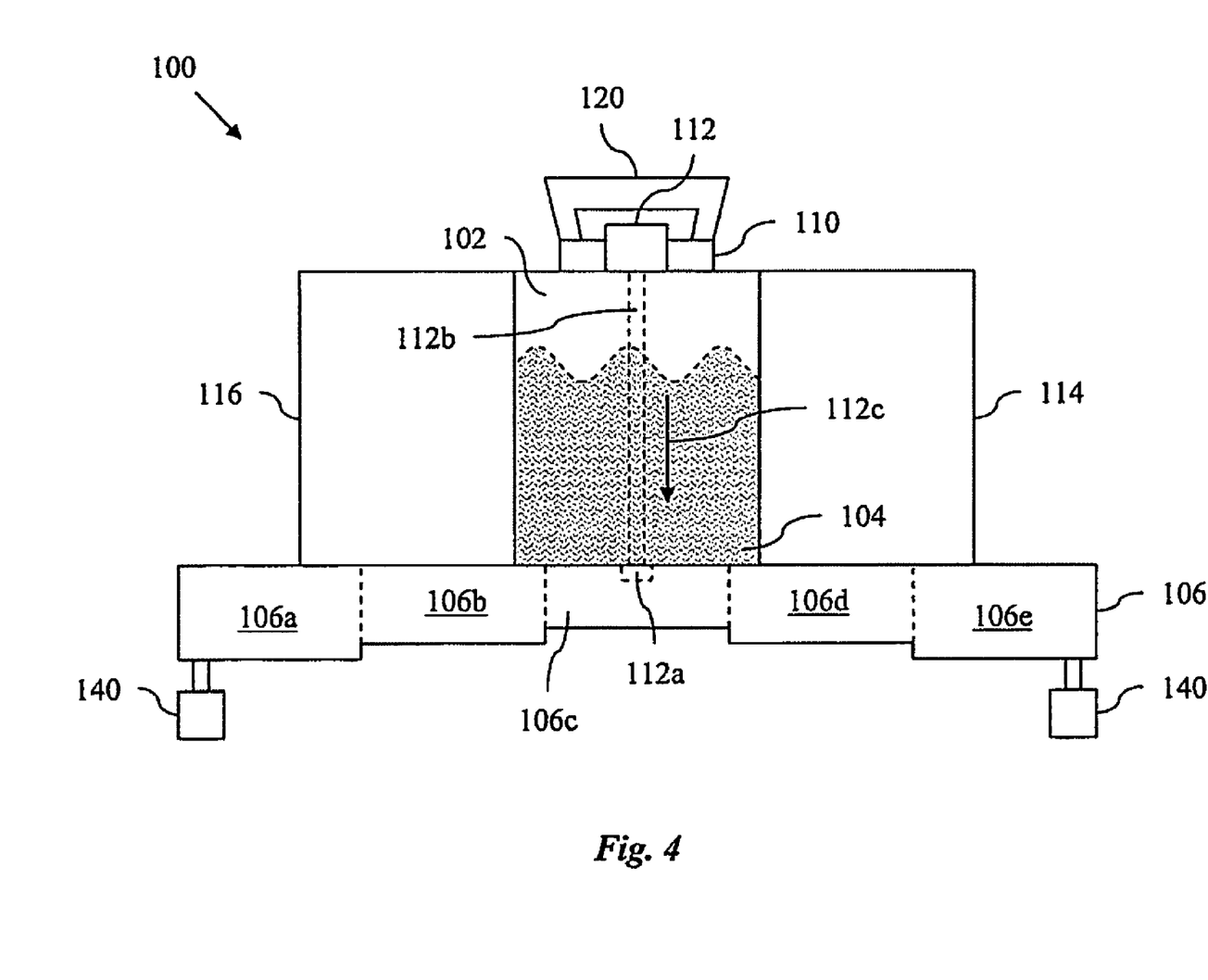
FIG. 4 is a front view of the apparatus shown in FIG. 3.

Referring to FIGS. 3 and 4, collectively, illustrated are various views of at least a portion of an exemplary embodiment of apparatus 100 according to aspects of the present disclosure. FIG. 3 is a top view of the apparatus 100, and FIG. 4 is a front view of the apparatus 100. The apparatus 100 includes a reservoir 102 configured to contain a liquid 104 and a reservoir 106 configured to receive a liquid transferring element, such as the mop head 30 with pad 50 of the device 10 shown in FIG. 1. The apparatus 100 includes one or more channels 108 configured to direct flow of the liquid 104 from the reservoir 102 to the reservoir 106.

A cap 110 is detachably coupled to the reservoir 102, possibly by threaded means, and is configured to seal the reservoir 102 and/or otherwise prevent liquid 104 from inadvertently spilling out of the reservoir 102. A handle 120 may be coupled to the cap 110, or may be integrally formed with the cap 110. The handle 120 may be configured to aid in the removal of the cap 110 from the reservoir 102, and/or to aid in the removal of the reservoir 102 from the apparatus 100, such as to fill or empty the reservoir 102. The reservoir 102 may include protrusions extending from the bottom of the reservoir 102 and configured to be received in corresponding recesses or apertures of a frame of the apparatus 100. Additionally, or alternatively, other means may be employed to align and/or secure the reservoir 102 within the apparatus 100.

The reservoir 102 also includes a user-operable valve 112 coupled to the reservoir 102. The valve 112 may be a push-button, ball, butterfly, or other type of valve configured for hand-operation by a user, such that a user can dispense a variable, user-selected amount of liquid 104 from the reservoir 102 to the reservoir 106. For example, to dispense a user-selected amount of liquid 104, a user may temporarily depress a button, turn a knob, or otherwise manipulate the valve 112 to cause a stopper 112a located at or near the bottom of the reservoir 102 to open and, thereby, allow liquid 104 to flow into the reservoir 106 by way of the channels 108. In the illustrated embodiment, the stopper 112a is connected to the user-interface portion of the valve 112 by an extension member 112b, such that depressing the valve 112 in the direction indicated by arrow 112c causes a substantially similar translation of the stopper 112a. When the user releases the valve 112, the stopper 112b resumes a closed state, such as where the valve is biased by a spring and/or other means towards a closed orientation. It is understood that alternate types of mechanisms may be employed to open and close the valve 112, whereby a user may select the amount of liquid 104 that is dispensed from the reservoir 102 into the reservoir 106.

In other embodiments within the scope of the present disclosure, a pre-selected or dosed amount of liquid may be dispensed upon user-actuation of the valve 112, in contrast to a user-selected amount. For example, with each press of a button, a fixed amount of liquid is dispensed. Consequently, if the pre-selected or dosed amount of liquid is less than the amount desired by the used, the user may press the button (or otherwise actuate valve 112) multiple times to dispense the desired amount of liquid.

When a user operates the valve 112, the one or more channels 108 direct the flow of liquid 104 to laterally-spaced openings 108a-e in a sidewall of the reservoir 106, where each opening 108a-e may correspond to one of a plurality of regions 106a-e of the reservoir 106. The regions 106a-e may be multi-level regions having varying heights or depths. For example, regions 106a and 106e may be substantially deeper than regions 106b and 106d, and regions 106b and 106d may be substantially deeper than region 106c. The channels 108, openings 108a-e, and/or regions 106a-e may be individually or collectively configured to distribute liquid 104 substantially evenly along the length of the reservoir 106. For example, the widths of the openings 108a-e may be configured to aid in the substantially even distribution of liquid 104 to the reservoir 106, such as where the openings 108a and 108e may be substantially larger (e.g., wider) than openings 108b and 108d, and openings 108b and 108d may be substantially larger (e.g., wider) than opening 108c.

The apparatus 100 may also include one or more receptacles 114, 116 and 118 configured to store, for example, used and unused liquid transfer pads. The receptacles 114, 116 and 118 may be constructed with protrusions, projections, recesses and/or indentations corresponding to similar features of each other or other components of the apparatus 100, so that the receptacles 114, 116 and 118 may fit securely within the apparatus 100, possibly in a similar manner to that of the reservoir 102. The receptacles 114, 116 and 118 may also be secured to each other by mechanical clips, fasteners and/or other means, which may be configured to provide stability to the apparatus 100. Additionally, although the illustrated embodiment depicts three receptacles 114, 116 and 118, other configurations of fewer or more receptacles are also within the scope of the present disclosure.

Figure 5:
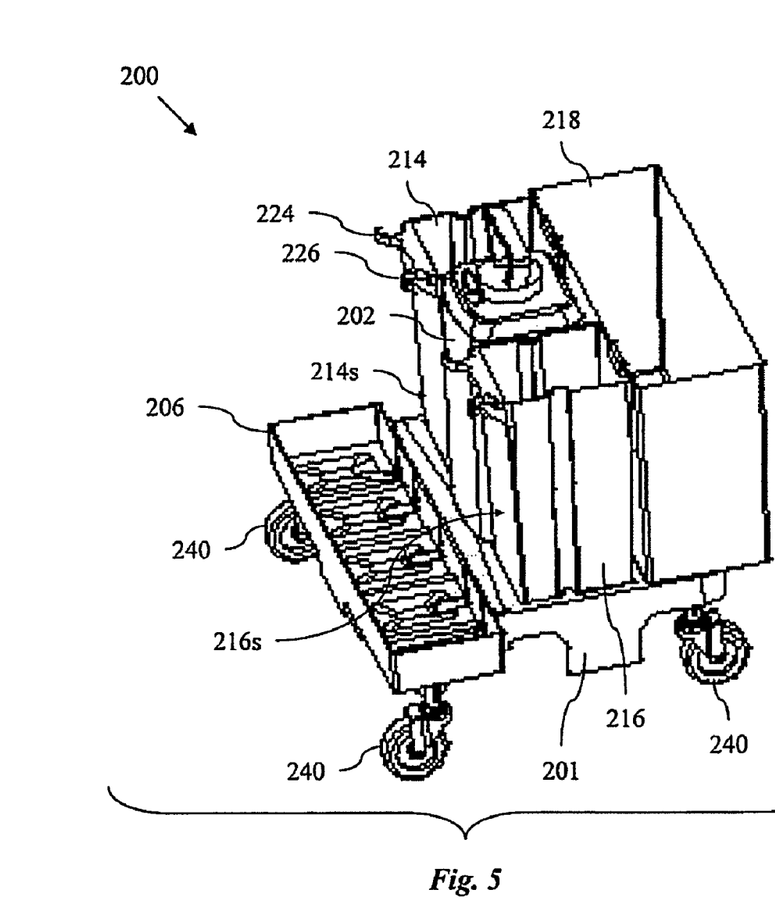
FIG. 5 is a perspective view of at least a portion of apparatus according to aspects of the present disclosure.
Figure 6:
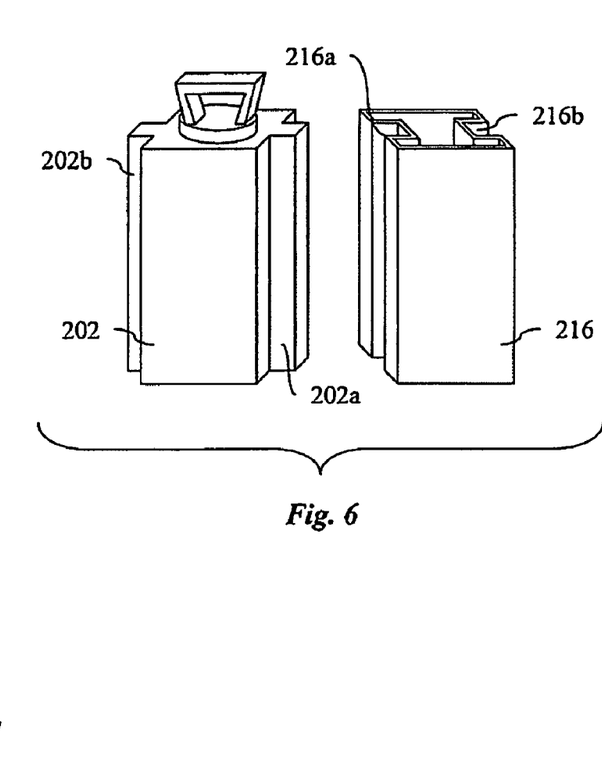
FIG. 6 is a perspective view of a portion of the apparatus shown in FIG. 5.
Figure 7:
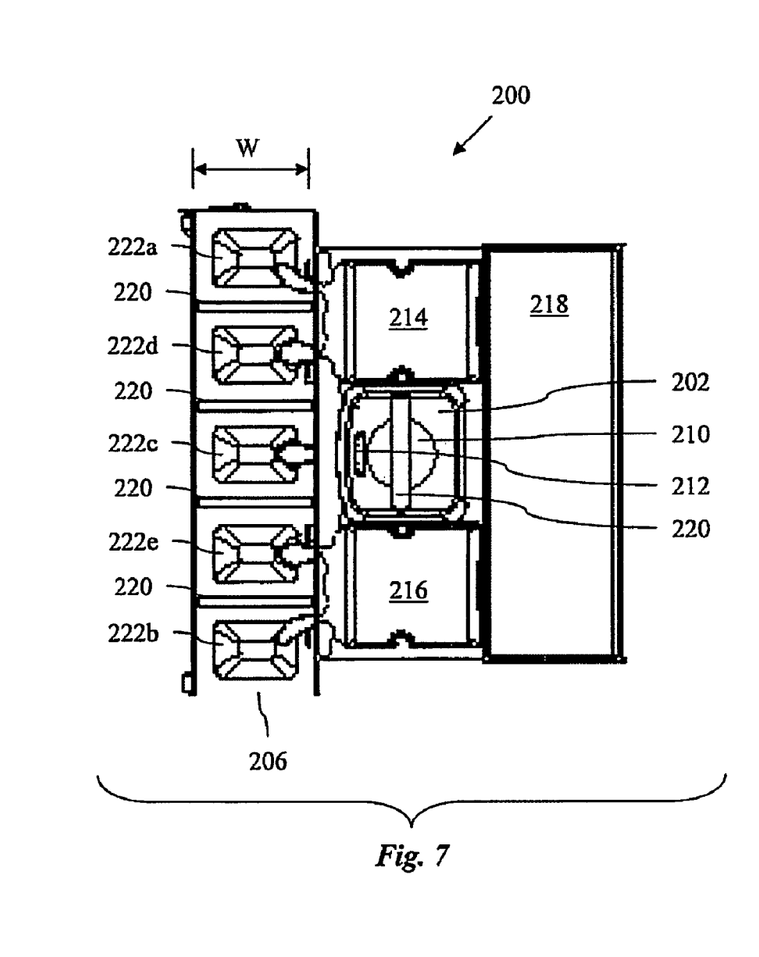
FIG. 7 is a top view of the apparatus shown in FIG. 5.
Figure 8:
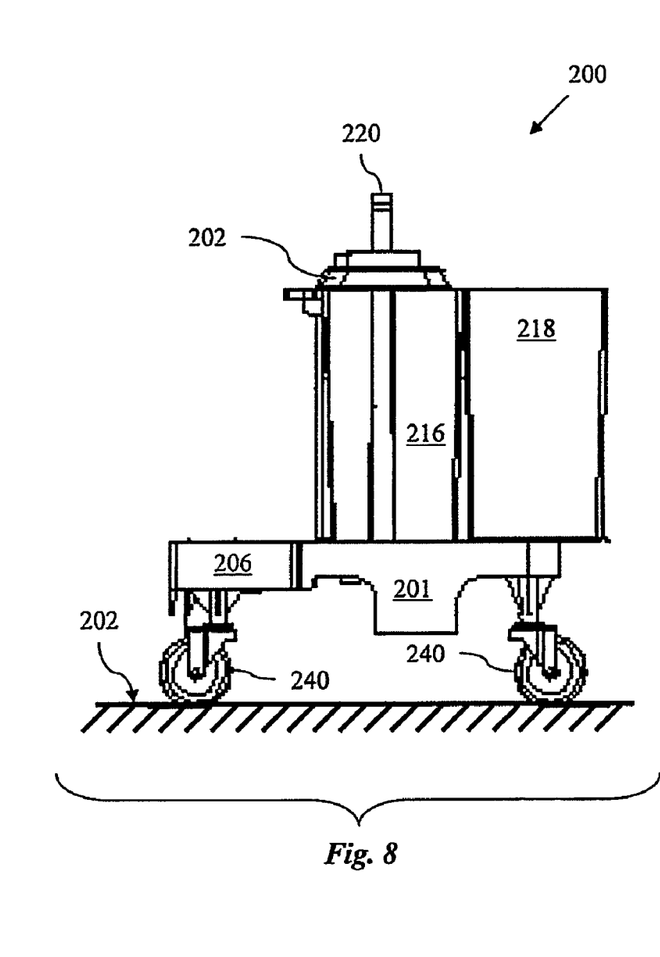
FIG. 8 is a side view of the apparatus shown in FIG. 5.

Referring to FIGS. 5-8, collectively, illustrated are various views of an another embodiment of the apparatus 100 shown in FIGS. 3 and 4, herein designated by the reference numeral 200. FIG. 5 is a perspective view of the apparatus 200, FIG. 6 is a perspective view of a portion of the apparatus 200, FIG. 7 is a top view of the apparatus 200, and FIG. 8 is a side view of the apparatus 200. The apparatus 200 is substantially similar to the apparatus 100 shown in FIGS. 3 and 4, with the possible exception of the features described below.

The apparatus 200 includes a frame 201, which provides an interface for receiving a reservoir 202, receptacles 214, 216 and 218, and wheel assemblies 240, when these components are included in a particular embodiment. The frame 201 may substantially comprise a plastic material, and may be formed by injection molding, although other compositions and fabrication processes are also within the scope of the present disclosure. A reservoir 206 may be formed integral to the frame 201, or may be a discrete component that is coupled to the frame 201 during assembly. The wheel assemblies 240 may each comprise a wheel, an axle, a frame, and a protrusion. In one such embodiment, the frame is configured to receive the axle about which the wheel is mounted, and the protrusion is configured to extend upward for engagement in a recess or aperture of a bottom-facing surface of the frame 201. However, other means for the portability of the apparatus 200 may alternatively or additionally be employed within the scope of the present disclosure, such as casters, sliders, and other types of wheel assemblies.

The receptacles 214, 216 and 218 may be substantially similar, if not identical, to the receptacles 114, 116 and 118 described above in reference to FIGS. 3 and 4. However, the receptacles 214 and 216 depicted in FIGS. 5-8 include vertically extending slots 215 and handle supports 224 and 226. Nonetheless, the receptacles 114 and 116 shown in FIGS. 3 and 4 may also include such features.

The slots 215 are configured to receiving corresponding ridges or other features protruding horizontally from the sides of the reservoir 202. For example, as shown in FIG. 6, illustrated is a perspective view of the reservoir 202 and the receptacle 216 shown in FIG. 5. The reservoir 202 includes a protrusion 202a extending along a substantial portion of its side proximate the receptacle 216 and is configured to be received into a slot 216a in the side of the receptacle 216 proximate the reservoir 202. Although not shown in FIG. 6, the receptacle 214 may have a similar recess configured to receive an additional protrusion 202b extending along the opposing side of the reservoir 202. Consequently, when the receptacles 214 and 216 are assembled to the frame 201, the reservoir 202 can be positioned on the frame 201 between the receptacles 214 and 216 by engaging the protrusions 202a, 202b of the reservoir with the recesses 216a of the receptacles 214, 216.

Additionally, the receptacle 216 shown in FIG. 6 includes a recess 216b on a side opposite the recess 216a. In one embodiment, the receptacles 214 and 216 may be substantially identical, which may ease manufacturing complexity, resources, and other concerns. Thus, the receptacle 216 may include the recess 216b so that the receptacle 216 can also be employed in the position of the receptacle 214.

Returning to FIG. 5, the receptacles 214 and 216 also include means 224, 226 for supporting a mop handle when the mop head attached to the handle is resting in the reservoir 206. For example, the means 224, 226 may be hook-like structures located proximate opposing edges of a surface 214s (or 216s) of the receptacles 214, 216 proximate the reservoir 206. The means 224, 226 may be mirror images of each other, such as to allow the receptacles 214 and 216 to be substantially identical and, thereby, as described above, requiring only one design to be utilized for both of the receptacles 214 and 216. This can make the process of manufacturing the receptacles 224, 226 more cost effective, among other possible advantages.

The reservoir 206 includes a plurality of recesses 222, each configured to contain liquid dispensed from the reservoir 202, and each separated by a projecting ridge 220 spanning the width W of the reservoir 202. The recesses 222 are the end points of fluid flow from channels directing flow from the reservoir 202 to the reservoir 206, such as the channels 108 described above with respect to FIG. 1. The recesses 222, possibly in conjunction with the channels, are configured to receive relatively even portions of the liquid that is dispensed from the reservoir 202, such that the dispensed liquid may be substantially evenly distributed along the length of the reservoir 206. Consequently, this can allow a liquid transfer element, such as the mop pad 50 of device 10 shown in FIG. 1, to more readily absorb the entire amount of liquid dispensed into the reservoir 206, and to more evenly absorb the liquid along the length of the mop pad. For example, the recesses 222 may be configured to pool the dispensed liquid away from the perimeter of the reservoir 206.

In an exemplary embodiment, the recesses 222 include a first recess 222a proximate a first end of the reservoir 206, a second recess 222b proximate a second end of the reservoir 206, a third recess 222c proximate a central portion of the reservoir 206, a fourth recess 222d between the first recess 222a and the third recess 222c, and a fifth recess 222e between the second recess 222b and the third recess 222c. The first and second recesses 222a and 222b are deeper than the fourth and fifth recesses 222d and 222e, which are each deeper than the third recess 222c. The first and second recesses 222a and 222b may have the same depth. The fourth and fifth recesses 222d and 222e may also have the same depth, less than the depth of the first and second recesses 222a and 222b, but greater than the depth of the third recess 222c.

Figure 9A:
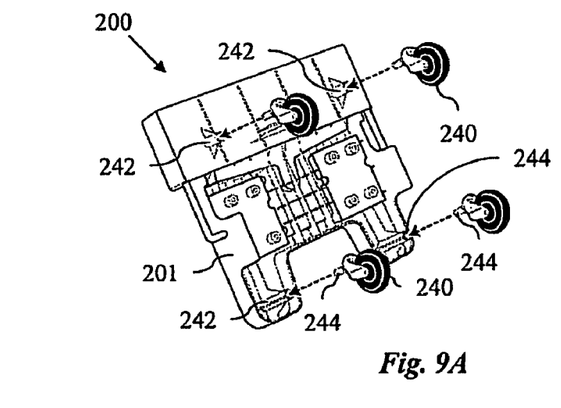
FIGS. 9A-9D are perspective views of various stages of assembly of apparatus according to aspects of the present disclosure.

Referring to FIG. 9A, illustrated is a perspective view of a portion of the apparatus 200 shown in FIGS. 5-8 in an intermediate stage of assembly according to one or more aspects of the present disclosure. In FIG. 9A, the frame 201 may be positioned upside-down to access supports 242 configured to receive the casters 240. Each support 242 may be or comprise a cylindrical or otherwise shaped boss protruding from the bottom of the frame 201 and have a central aperture 243 configured to receive an attachment member 244 of a casters 240. the supports 242 may be integral to the frame 201 or discrete elements coupled to the frame 201. The attachment member 244 may be or include a cylindrical rod or otherwise shaped protrusion extending from the body of the caster 240. The attachment member 244 may be configured to couple within the aperture 243 of the support 242, such as where one or both of the attachment member 244 and aperture are threaded, although ball-detents, adhesive, washers, and/or other means may also be employed to secure the attachment member 244 within the aperture 243. In the exemplary embodiment shown in FIG. 9A, the apparatus 200 may include four casters 240, although other embodiments within the scope of the present disclosure may include a larger or smaller number of casters 240. Upon accessing the supports 242, the casters 240 may be assembled to the frame 201, as indicated by the dashed arrows in FIG. 9A.

Figure 9B:
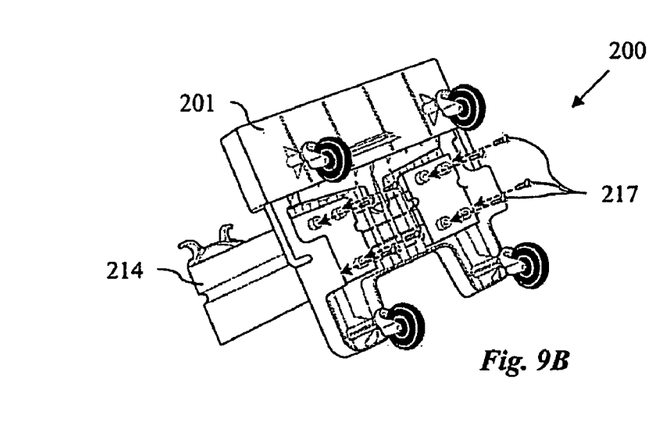

Referring to FIG. 9B, illustrated is a perspective view of the apparatus 200 shown in FIG. 9A in another, possibly subsequent stage of assembly according to one or more aspects of the present disclosure. The reservoirs 214 and 216 may each be assembled to the frame 201 by one or more threaded fasteners 217 each extending through frame 201 and into a corresponding one of the reservoirs 214 and 216, as indicated by the dashed arrows in FIG. 9B. Although four threaded fasteners 217 are employed to secure each of the reservoirs 214 and 216 to the frame 201 in the exemplary embodiment depicted in FIG. 9B, a fewer or greater number of fasteners 217 may also be employed within the scope of the present disclosure. Moreover, means other than the threaded fasteners 217 may alternatively or additionally be employed to secured the reservoirs 214 and 216 to the frame 201, such as adhesive, interference fit, clips, and/or clamps, among other means.

Figure 9C:
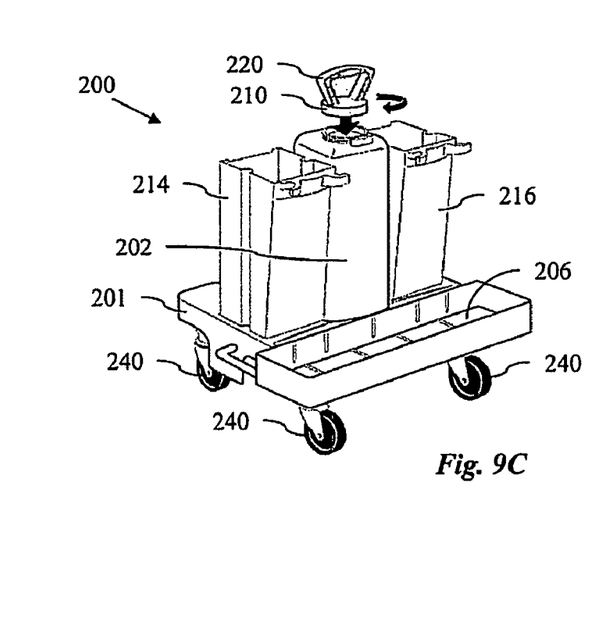

Referring to FIG. 9C, illustrated is a perspective view of the apparatus 200 shown in FIG. 9B in another, possibly subsequent stage of assembly according to one or more aspects of the present disclosure. The sealable reservoir 202 may be assembled within the apparatus 200 by sliding the reservoir 202 between the previously-assembled reservoirs 214 and 216. The reservoir 202 may remain in position via engagement of external features with corresponding features of the reservoirs 214 and 216 (e.g., see FIG. 6). Thus, the reservoir 202 may be laterally positioned or fixed relative to other components of the apparatus 200 while remaining vertically restrained only by gravity. The reservoir 202 may alternatively or additionally be more positively secured to the frame via one or more threaded fasteners and/or other attachment means. The cap 210 and/or handle 220 may be assembled to the reservoir 202 either before or after the reservoir has been assembled within the apparatus 200, as indicated in FIG. 9C by the rotational arrow.

Figure 9D:
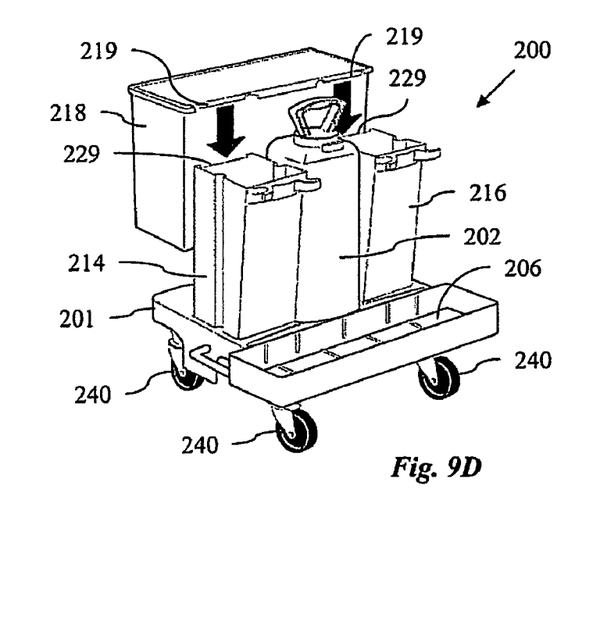

Referring to FIG. 9D, illustrated is a perspective view of the apparatus 200 shown in FIG. 9C in another, possibly subsequent stage of assembly according to one or more aspects of the present disclosure. The reservoir 218 may be assembled within the apparatus 200 by sliding the reservoir 218 along the rear surfaces (relative to FIG. 9D) of the reservoirs 202, 214 and/or 216 until an upper lip 219 of the reservoir 218 engages an upper edge of the reservoirs 214 and 216, as indicated by the arrows in FIG. 9D. Thus, the reservoir 218 may be laterally positioned or fixed relative to other components of the apparatus 200 while remaining vertically restrained only by gravity. The reservoir 218 may alternatively or additionally rest on the upper surface of the frame 201 and/or be coupled directly to the frame 201, such as via threaded fasteners, adhesive, clamps, interference fit, and/or other means. As also shown in the exemplary embodiment of FIG. 9D, the reservoirs 214 and 216 may each have a recess 229 along the upper edge of their rear walls, where the recesses 229 may be configured to receive and possibly engage the lip 219 of the reservoir 218. The lip 219 may extend outward from the upper edge of the reservoir 218, and may further have a portion extending downward to form a U-shape for engaging the recesses 229 and/or other portions of the reservoirs 214 and 216.

Figure 10:
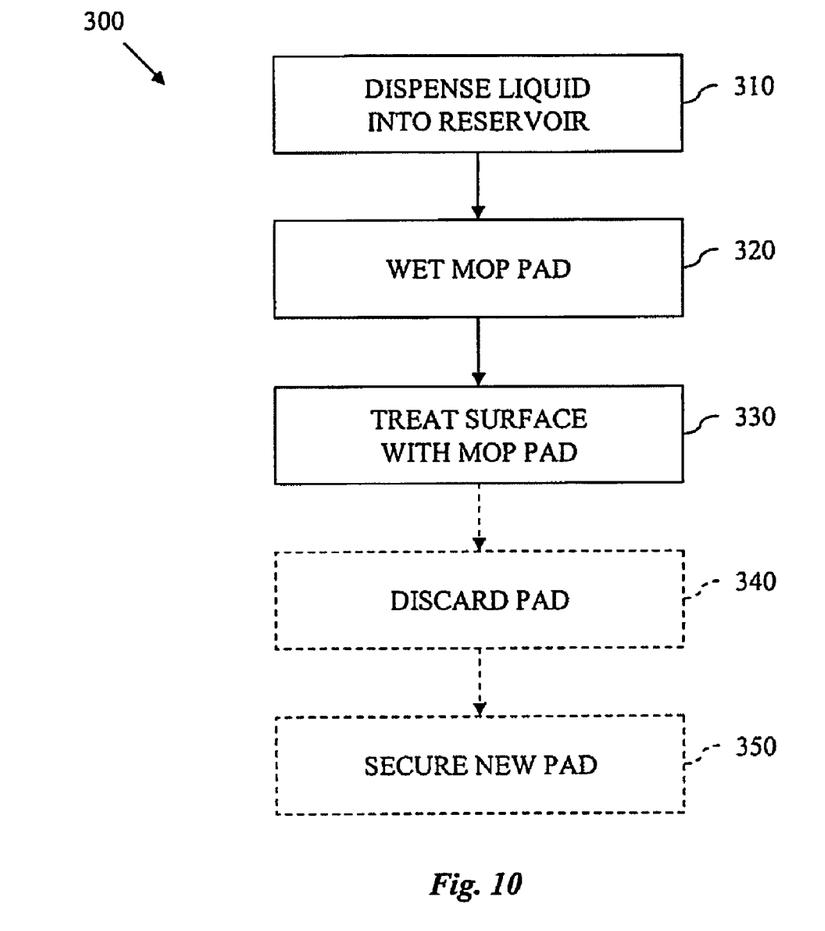
FIG. 10 is a flow-chart diagram of at least a portion of a method according to aspects of the present disclosure.

Referring to FIG. 10, illustrated is a flow-chart diagram of at least a portion of a method 300 of transferring liquid to a surface according to aspects of the present disclosure. The method 300 may be performed in conjunction with embodiments of apparatus within the scope of the present disclosure, such as the apparatus 100 shown in FIGS. 3 and 4 and the apparatus 200 shown in FIGS. 5-8, as well as in conjunction with a mop or surface treatment applicator which may be substantially similar to the device 10 shown in FIGS. 1 and 2. Thus, although merely for the sake of simplicity, the method 300 shown in FIG. 9 is described below with reference to components and/or features depicted in one or more of FIGS. 1-8. Nonetheless, one or more steps of the method 300 may be performed with other apparatus and still remain within the scope of the present disclosure.

The method 300 includes a step 310 during which liquid 104 is dispensed from the reservoir 102 into the reservoir 106. The liquid 104 may be a cleaning solution, such as may comprise a detergent, disinfectant, and/or other cleaning agent, possibly diluted in water and/or other liquid solution. The liquid 104 may alternatively be a surface treatment being applied to a floor or other surface, such as a paint, stain, sealant, or other liquid. Such surfaces may be or include a wood surface, a stone surface, a concrete surface, and/or a linoleum surface, among others. The amount of liquid 104 dispensed during the step 310 is selected by the user, such as by a user deciding the duration for which the valve 112 should be opened or dosed. The amount of liquid 104 dispensed during the step 310 may also or alternatively be a metered and/or predetermined amount. The liquid 104 may flow from the reservoir 102 into the reservoir 106 due to gravitational forces, or may alternatively be pumped from the reservoir 102 into the reservoir 106, whether with or against the force of gravity. The amount of liquid 104 dispensed during the step 310 may be about equal to the amount of liquid 104 that can be substantially absorbed by the mop pad 50, although other embodiments may also be within the scope of the present disclosure.

During a subsequent step 320, the mop pad 50, applicator, or other liquid transfer apparatus is placed in the reservoir 106 for a duration sufficient to substantially absorb the liquid 104 dispensed therein during step 310. This may be referred to as "wetting" the mop pad 50. The mop pad 50 may be a microfiber mop pad, among other types of liquid transfer applicator apparatus within the present scope.

The mop pad 50 is then removed from the reservoir 106 during a step 330 and used to treat the intended surface. For example, the wetted mop pad 50 may be pushed across a floor surface being cleaned. This may be continued until the liquid 104 that has been absorbed by the mop pad 50 is consumed. The method 300 may end with this step 330.

However, as indicated by the dashed lines, the method 300 may also include a step 340 during which the mop pad 50 may be removed from the mop head 30 and discarded, replaced, and/or reused, such as by placing the used mop pad 50 in the receptacle 118, which may be sized to contain the removed mop pad(s) 50 until more proper disposal is more convenient, for example. In a subsequent optional step 350, a new mop pad 50 may be secured to the mop head 30, and one or more steps of the method 300 may be repeated. In this manner, the contaminates picked up from the floor or other surface being treated during the step 330 will not be re-introduced to the surface, because the contaminated mop pad 50 is discarded before additional liquid 104 is dispensed into the reservoir 106. The receptacles 114 and 116 may, therefore, be configured to contain the unused mop pads 50 until they are needed, such as by standing the mop pads 50 on end such that they extend above the top edge of the receptacles. In this manner, user-access of the new pads 50 may be more convenient, and the new pads 50 can be kept separate from the used pads 50 contained in the receptacle 118, thus preventing inadvertent contamination of the new pads 50.

Figure 11:
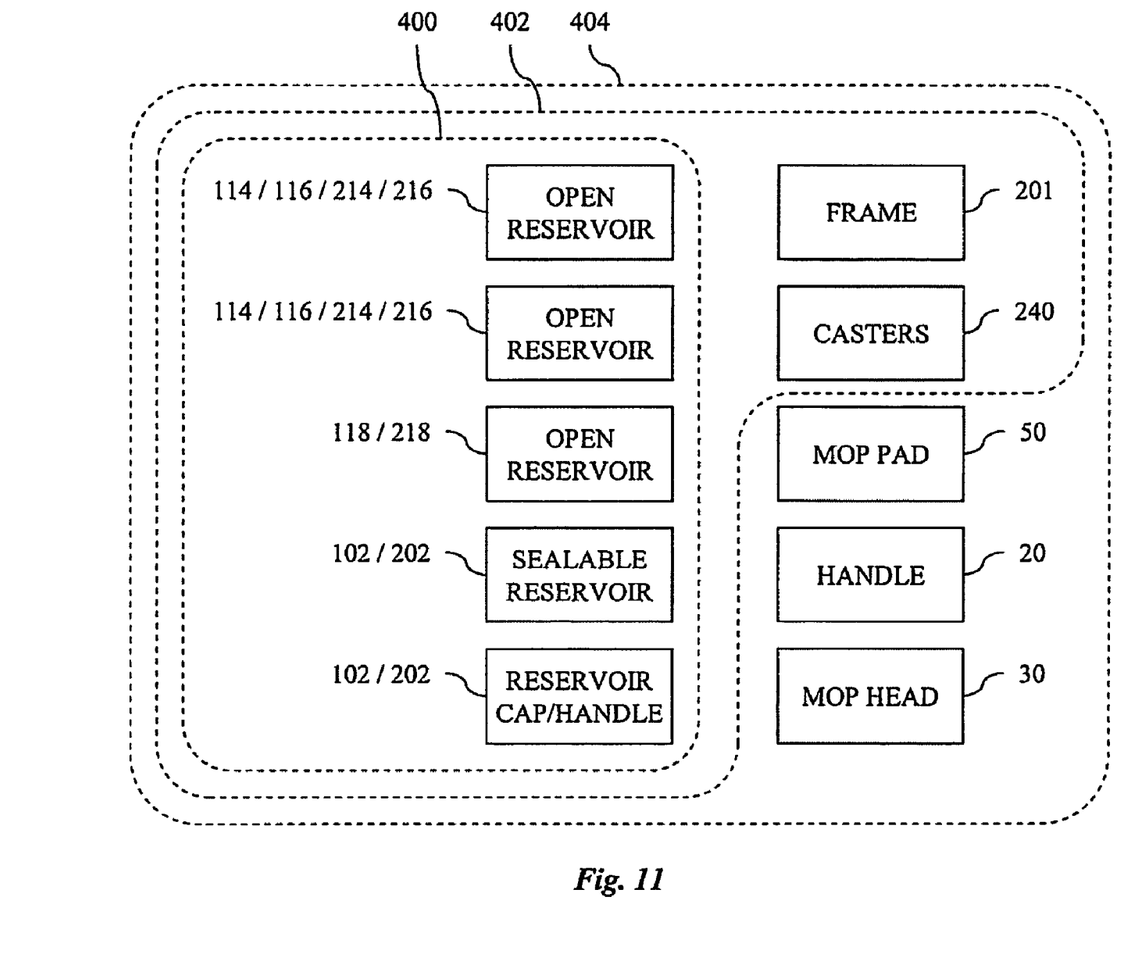
FIG. 11 is a schematic view of a kit according to aspects of the present disclosure.

Referring to FIG. 11, illustrated is a schematic view of an exemplary embodiment of a kit 400 according to one or more aspects of the present disclosure. The kit 400 includes two open reservoirs such as the reservoirs 114 and 116 shown in FIGS. 3 and 4 and/or the reservoirs 214 and 216 shown in FIGS. 5-8. The kit 400 also includes an open reservoir such as the reservoir 118 shown in FIGS. 3 and 4 and/or the reservoir 218 shown in FIGS. 5-8. The kit 400 also includes a sealable reservoir such as the reservoir 102 shown in FIGS. 3 and 4, including the dispensing means 112, and/or the reservoir 202 shown in FIGS. 5-8, including the dispensing means 212. The kit 400 also includes a reservoir cap and handle, such as the cap 110 and the handle 120 shown in FIGS. 3 and 4 and/or the cap 210 and the handle 220 shown in FIGS. 5-8.

FIG. 11 also depicts another exemplary embodiment of a kit 402 according to one or more aspects of the present disclosure. The kit 402 includes the components of kit 400. The kit 402 also includes a frame such as the frame 201 shown in FIGS. 5-8, including the reservoir 206 shown in FIGS. 5-8. The kit 402 may also include a plurality of casters such as the casters 240 shown in FIGS. 5-8.

FIG. 11 also depicts another exemplary embodiment of a kit 404 according to one or more aspects of the present disclosure. The kit 404 includes the components of kit 402. The kit 404 also includes one or mop pads 50 as shown in FIG. 2, a handle portion such as the telescoping handle portion 20 shown in FIG. 1, and a mop head portion 30 as shown in FIG. 1.

Any of the kits 400, 402 and 404, as well as others within the scope of the present disclosure, may include the components described above in numbers other than as depicted in FIG. 11. Moreover, any kit within the scope of the present disclosure may additionally comprise a quantity of solution to be used in cleaning or treating a surface as described above, such as via utilization of the method 300 shown in FIG. 10. For example, the solution may be or include a cleaning solution, such as may comprise a detergent, disinfectant, and/or other cleaning agent, possibly diluted in water and/or other liquid solution. The solution may alternatively be a surface treatment for application to a floor or other surface, such as a paint, stain, sealant, or other liquid. Such surfaces may be or include a wood surface, a stone surface, a concrete surface, and/or a linoleum surface, among others.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An apparatus, comprising:
   a first reservoir configured to contain a liquid;
   a second reservoir configured to receive an element configured to absorb the liquid; and
   user-operable dispensing means for dispensing a user-selected amount of the liquid from the first reservoir to the second reservoir;
   wherein the element is configured to absorb a substantial portion of the dispensed liquid in the second reservoir for transferring the absorbed liquid out of the second reservoir in response to user-removal of the element from the second reservoir,
   wherein the second reservoir includes a plurality of liquid-containing recesses configured to pool the dispensed liquid away from a perimeter of the second reservoir,
   wherein the plurality of liquid-containing recesses are multi-leveled.

2. The apparatus of claim 1 wherein the element is a microfiber cleaning pad.

3. The apparatus of claim 1 wherein the liquid comprises a cleaning agent.

4. The apparatus of claim 1 wherein the liquid comprises a surface treatment agent, wherein the surface is selected from the group consisting of:
   a wood surface;
   a stone surface;
   a concrete surface; and
   a linoleum surface.

5. The apparatus of claim 1 further comprising a plurality of channels configured to direct flow of the liquid from the first reservoir to the second reservoir when dispensed via the user-operable dispensing means.

6. The apparatus of claim 5 wherein the plurality of channels are configured to direct flow of the liquid to the second reservoir such that the dispensed liquid is substantially evenly distributed along a length of the second reservoir.

7. An apparatus, comprising:
a first reservoir configured to contain a liquid;
a second reservoir configured to receive an element configured to absorb the liquid; and
user-operable dispensing means for dispensing a user-selected amount of the liquid from the first reservoir to the second reservoir;
wherein the element is configured to absorb a substantial portion of the dispensed liquid in the second reservoir for transferring the absorbed liquid out of the second reservoir in response to user-removal of the element from the second reservoir,
wherein the second reservoir includes a plurality of liquid-containing recesses configured to pool the dispensed liquid away from a perimeter of the second reservoir,
wherein the plurality of liquid-containing recesses includes:
a first recess proximate a first end of the second reservoir;
a second recess proximate a second end of the second reservoir;
a third recess proximate a central portion of the second reservoir between the first and second recesses;
a fourth recess between the first and third recesses; and
a fifth recess between the second and third recesses.

8. The apparatus of claim 7 wherein the first and second recesses are deeper than the fourth and fifth recesses, and wherein the fourth and fifth recesses are deeper than the third recess.

9. An apparatus, comprising:
a first reservoir configured to hold a liquid;
a second reservoir configured to receive an element;
user-operable dispensing means for dispensing a user-selected amount of the liquid; and
a plurality of channels configured to direct flow of the user-selected amount of the liquid from the first reservoir to the second reservoir when dispensed via the user-operable dispensing means;
wherein the element is configured to absorb a substantial portion of the dispensed liquid in the second reservoir for transferring the absorbed liquid out of the second reservoir in response to user-removal of the element from the second reservoir,
wherein the second reservoir includes a plurality of multi-leveled, liquid-containing regions each fluidly-coupled to a corresponding one of the plurality of channels.

* * * * *